Oct. 7, 1941.  J. P. BADENHAUSEN  2,258,401
TREATMENT OF WASTE LIQUIDS FROM PULP PRODUCTION AND THE LIKE
Filed Sept. 27, 1939  2 Sheets-Sheet 2

Inventor:
John Phillips Badenhausen,
By Z. T. Wolfensmith
Attorney.

Patented Oct. 7, 1941

2,258,401

UNITED STATES PATENT OFFICE 2,258,401

TREATMENT OF WASTE LIQUIDS FROM PULP PRODUCTION AND THE LIKE

John Phillips Badenhausen, Philadelphia, Pa.

Application September 27, 1939, Serial No. 296,754

11 Claims. (Cl. 23—48)

In this production of pulp by the various methods now employed, whether acid or alkaline, the cellulose substance in the form of pulp is separated, and the non-cellulose compounds of the wood which have gone into solution or suspension in the cooking liquor are contained in and discharged with the waste liquor. The waste liquor from the cooking processes includes the reaction products of the lignin, carbohydrates and resins of the wood and has considerable potential heat value which heretofore in many instances has been wasted or ineffectively utilized.

In the manufacture of pulp by the alkaline processes, including the sulphate process and the soda process, as now practiced and where recovery of heat and chemicals is desired, the waste liquor or black liquor from the digesters is usually concentrated or thickened by using evaporators in series and the water content is reduced to an extent such that the combustible constituents of the waste liquor may be burned in a recovery furnace, with or without auxiliary fuel. In some instances and for self sustaining combustion in the recovery furnace, the water content of the waste liquor is reduced so that the solids are approximately fifty per cent of the content thereof. When this is done considerable quantities of steam are required by the evaporators for the removal of the excess water. In some instances the concentration is continued until the solids in the waste liquor are of the order of seventy-five per cent thereof, and if this is done it further increases the steam demand.

For the purpose of reducing the water content of the waste liquor from the alkaline processes of pulp production, it has heretofore been customary to introduce the same into evaporators, usually arranged in stages, and use steam from the recovery furnace boiler, or from some other source, in the evaporators. This, of course, reduces the quantities of steam available for other uses in the plant.

In the present practice of the alkaline processes of pulp production large quantities of heat which could be utilized are wasted. Some of this heat is in the exhaust combustion gases from the recovery unit and other and much larger quantities are available elsewhere in the plant, and the consequent loss in efficiency and plant economy is great.

In some instances, in order to supply the electrical energy which is needed in the pulp mill, portions of the steam generated in the boiler of the recovery furnace, or in a waste heat or other boiler forming part of the pulp mill equipment, have been utilized in turbo-generators or in other steam driven prime movers connected to electric generators. In such instances, it has been customary in accordance with conventional practice to operate the turbine or other prime mover as a condensing unit with water cooling, and the heat transferred to the condensing water is wasted.

In the chemical recovery furnaces, and particularly those utilized in the alkaline processes of pulp production, it has been customary to utilize also a portion of the heat available in the combustion gases for preheating the air for combustion, and in economizers, but this has not always been done as effectively or as completely as might be, with resultant loss of heat at this point. With many of the chemical recovery furnaces heretofore available also, there has been a considerable carry over of the recoverable chemicals beyond the furnace and this has necessitated the use of Cottrell precipitators or similar apparatus.

In the sulphite or acid process of preparing pulp, the cellulosic material is also separated in the form of pulp from the non-cellulose compounds of the wood, and the latter, in the cooking liquid, are discharged as a waste liquid. These non-cellulose compounds frequently represent more than fifty per cent of the total weight of the wood. The waste liquor from the sulphite process is highly corrosive and very little has heretofore been done to recover any of the heat from this waste liquor. The non-aqueous constituents of the waste liquor have a potential heat value which has heretofore been wasted because of the difficulties involved in the concentration or reduction of the water content of the waste liquor to a quantity such that the combustible constituents may be burned in a furnace. These difficulties have arisen in the main because of the corrosive nature of the liquor and its destructive effect on the apparatus heretofore available.

In plants for the production of sugar, alcohol and the like, large quantities of waste liquids are obtained which like the waste liquors from the pulp mills contain large quantities of water, combustible constituents, and also recoverable chemicals. The evaporated molasses residue, if the water content thereof is reduced to the proper extent, may also be introduced into a recovery furnace and the combustible constituents thereof burned for the production of heat and the recovery of recoverable chemicals.

The waste liquor, whether obtained from the digesters after the completion of the cooking processes in the acid or alkaline processes of pulp production, or from the distilling or sugar refining processes, contains large quantities of water and to evaporate this water large quantities of heat are required. The quantity of heat which is necessary for a given quantity of waste liquor is still greater if the waste liquor is to be dried to a powder or to a dry mass for the burning of the combustible constituents thereof in a recovery furnace. It may be pointed out that to evaporate one thousand pounds of water, 1250 pounds of steam would be required in single effect evaporators.

In accordance with the present invention, which is particularly adaptable to pulp mills, but which also is useful in other fields where waste liquids are obtained having the characteristics herein indicated, a more effective utilization is provided of the heat which is available in hitherto neglected parts of the energy stream. Resultant economies of appreciable magnitude are obtained.

The present invention contemplates making available and utilizing in a more effective manner the heat which is available in the combustibles in waste liquors of industrial processes.

The present invention further contemplates the production of steam and electrical energy by utilizing effectively the combustible constituents of waste liquors from chemical processes.

The present invention further contemplates a more effective mode of treatment of waste liquors, particularly in the preparation thereof for burning the combustible constituents in a recovery furnace.

The present invention further contemplates the utilization of heat from a portion of the energy stream which has heretofore been regarded as irretrievable.

The present invention further contemplates the treatment of the waste liquor by the heat available in steam at sub-atmospheric pressures.

The present invention further contemplates the utilization of heat heretofore wasted, which is derived from the condenser of the prime mover, for the evaporating of the water in the waste liquor.

With the apparatus and method of the present invention, also it is now possible to handle and prepare for combustion highly corrosive waste liquors containing combustible materials, such as the waste liquor from the sulphite process of pulp production, in a manner which has not heretofore been feasible.

The nature and characteristic features of the invention will be more readily understood from the following description, taken in connection with the accompanying drawings forming part hereof, in which.

It will, of course, be understood that the description and drawings herein contained are illustrative merely, and that various modifications and changes may be made in the structure and methods disclosed without departing from the spirit of the invention.

Figure 1:
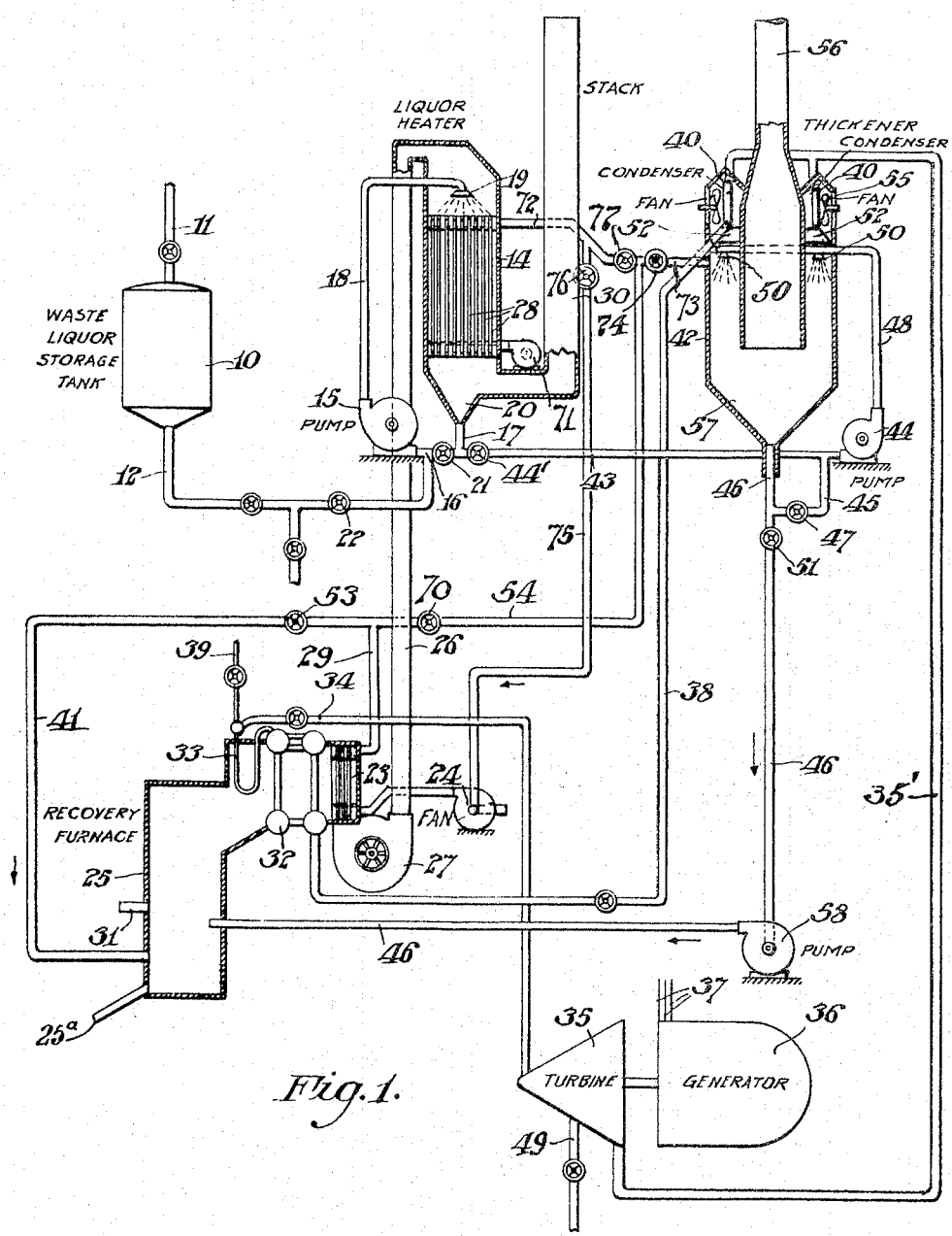
Figure 1 is a diagrammatic view showing one form of apparatus for recovery in accordance with the present invention.

Referring more particularly to Fig. 1 of the drawings the invention is shown diagrammatically, and merely by way of illustration with more particular reference to the processes of pulp production.

A storage tank 10 may be provided and connected by a pipe 11 to the digesters or cooking vessels (not shown) for receiving waste liquor therefrom. The tank 10 in some installations is not essential, since the flow from the cooking vessels, digesters, or other source may be regulated for the desired feeding of the liquor. The tank 10 is connected by a pipe 12 to a liquor heater 14 which is provided for the preliminary treatment of the waste liquor. A pump 15 is provided with the inlet thereof connected by a pipe 16 and a pipe 17 to the bottom of the heater 14. The discharge side of the pump 15 is preferably connected by a pipe 18 to a plurality of spray nozzles 19 for spraying the waste liquor into the upper part of the heater 14. The bottom of the heater 14 preferably provides a collecting space 20 as hereinafter referred to.

A valve 21 is provided in the pipe 16 and a valve 22 is provided in the pipe 12 and by suitable regulation of the valves 21 and 22 the pump 15 provides for introduction of the waste liquor into the liquor heater 14. By suitable adjustment of the valves 21 and 22 also, the recirculation of the waste liquor within the liquor heater 14 may be effected, if this is desired. The liquor heater 14 is preferably connected to a recovery furnace 25 by a duct 26 for receiving the exhaust gases of combustion which have passed through the air preheater 23 of the recovery furnace and are withdrawn by the induced draft fan 27. The air is supplied to the preheater 23 by the forced draft fan 24. The air from the air preheater 23 may be delivered by the duct 29 and the duct 41, with the control valve 53 therein, to the recovery furnace 25 for supporting combustion therein or if desired the whole or a part of the preheated air may be delivered by the duct 54 having the control valve 70 therein, for other purposes.

The gases of combustion are preferably introduced into the liquor heater 14 and directed so that they come in contact with and intermingle with the waste liquor sprayed by the nozzles 19. To aid the contact and intermingling the liquor heater 14 may be provided with a plurality of tubes 28 for confining the fluid in its passage.

As the gases from the preheater 23 are usually at a higher temperature than is desired for the treatment of the waste liquor in the liquor heater 14 a portion of the heat is preferably extracted therefrom. This is preferably accomplished by circulating air over the external surfaces of the tubes 28 by means of the fan 71 and delivering the air heated by contact with the tubes 28 to the duct 72, having the control valve 77 therein, for other purposes. The duct 72 is preferably connected to the duct 73, having the control valve 74 therein, and also to the duct 75, having the control valve 76 therein. The duct 75 is preferably connected to the inlet side of the fan 24.

By the contact in the liquor heater 14 the waste liquor is heated by waste heat in the combustion gases, while at the same time the temperature is reduced by the cooling action of the air around the tubes 28. The waste liquor in the combustion gases gives up a portion of its moisture content and in turn entrains, and condenses to solid or collectible form for collection in the space 20 the chemicals which have sublimed and have been carried over from the recovery furnace 25. A discharge pipe 30 for the liquor heater 14 is provided for the discharge of the combustion gases from the liquor heater 14.

The recovery furnace 25 may be of any preferred type, and may be of a type in which the combustion, with waste liquor of a concentration of approximately fifty per cent solids, is self sustaining without using auxiliary fuel. The recovery furnace may, if desired, be provided with a spout 25ᵃ for the withdrawal of chemicals separated by the combustion. If desired the recovery furnace 25 may be of the type in which auxiliary fuel supplied at 31 is employed to increase the steam capacity of the steam generating section thereof or in aid of the combustion of the combustibles in the waste liquor.

The recovery furnace employed is equipped for the recovery of heat by steam generation and is provided with a steam generating section 32 and a superheater 33 for supplying superheated steam through a suitable steam main 34 to a prime mover 35 such as a turbine. The turbine 35, or other prime mover, is preferably connected to an electric generator 36 and the generator 36 has power leads 37 for supplying electrical energy for use in the plant. The turbine 35 may be an extraction turbine with a tap 49 for process steam, and a pipe 35' for the exhaust steam. The turbine 35, or other prime mover, is operated as a condensing unit and for this purpose, in accordance with the present invention, the low level heat heretofore transferred to the condensing water at sub-atmospheric steam pressures and in a large measure wasted is made available by and transferred from the condensate for use in connection with the treatment of the waste liquor. The condensate may, of course, be used as boiler feed water in the manner customary in power plant practice and returned to the boiler 32 by the pipe 38.

In accordance with my invention the heat at low level derived from the condensing of the steam is made most readily available by the use of a surface condenser over which large quantities of air are circulated to obtain the desired vacuum which may, if desired, be of the order of 27 inches. An air cooled condenser provides the most effective means for transferring heat at the low level from the steam which is condensed to the large quantity of air which is utilized for thickening of the waste liquor in the course of the treatment thereof, as hereinafter more fully referred to.

The air condensers 40 preferably are constructed to provide a highly effective heat transfer while at the same time not requiring a large space and a condenser having highly effective heat transfer tubes, such for example as are now used in air conditioning apparatus, may be employed.

A thickener 42 is provided and is connected by a suitable pipe 43, having a control valve 44' therein, to the pipe 17. The pipe 43 is connected to the inlet side of a pump 44. The inlet side of the pump 44 is also connected by a pipe 45 and a pipe 46 to the bottom of the thickener 42. The pipe 45 is provided with a control valve 47. The discharge side of the pump 44 is connected by a pipe 48 to a plurality of nozzles 50 in the upper part of the thickener 42. The valve 47 in the pipe 45 and the valve 51 in the pipe 46 by suitable regulation thereof provide for introduction of the partly treated liquor from the heater 14 to the thickener 42, and also for the recirculation of the liquor in the thickener 42, if a recirculation is desired.

The air condensers 40 are preferably located in the upper part of the thickener 42 so that the air heated in the condensers 40 to a temperature according with that of the vacuum is supplied to the thickener 42 and directed by vanes 52 downwardly and preferably helically therein into intimate contact with the waste liquor sprayed into the thickener 42.

Heated air may, if desired, be supplied to the thickener 42 by the ducts 72 and 73 connected to the liquor heater 14 and also, if desired, from the air preheater by the ducts 29, 54 and 73.

The heated air supplied to the thickener 42 is effective for taking up and carrying off the water in the waste liquor. The temperature of the air supplied to the thickener 42 past the condensers, which is determined largely by the vacuum at which the prime mover 35 is operated, the quantity of air supplied to the condensers 40 by the fans 55, and the effectiveness of the heat transfer to the air, is preferably selected and maintained at a low level which will not bring about any chemical changes in the waste liquor during the contact of the heated air and waste liquor. For a turbine operated at approximately 27 inches of vacuum the temperature of the air stream flowing from the condensers 40 will be of the order of 130° Fahrenheit.

The temperature of the air supplied to the thickener 42 from the liquor heater 14 or from the air heater 23 is determined by the extent of surface employed in these units and the quantity of air supplied thereto, and may be of the same order as that supplied from the condensers 40.

The waste liquor by giving up moisture to the heated air in contact therewith has the moisture content thereof reduced, and when this reduction is effected to the extent that the waste liquor is half solids and half water it may be introduced into a recovery furnace for combustion of the combustible constituents thereof in a self sustaining process and without the necessity for using auxiliary fuel. If the reduction of water content is not carried this far the combustion with auxiliary fuel is possible, but this is dependent largely upon questions of plant economy and steam and electric demand in the plant.

The waste liquid may, if desired, have substantially all the water content removed so that it is obtained in a powdered or dry state from the thickener 42.

A discharge pipe 56 is provided for the discharge of the moisture laden air from the thickener 42. The lower part of the thickener 42 serves as a collecting space 57 for the dehydrated residues and is connected by the pipe 46 which has a control valve 51 and a pump 58 therein to the recovery furnace 25. The concentrated waste liquor from the thickener 42, of a moisture content dependent upon the extent to which the moisture extraction has been carried may thus be introduced into the recovery furnace 25 for combustion and, if desired, for recovery of chemicals.

In the form of my invention illustrated in Figure 1, the waste liquor is supplied from the storage tank 10 through the pipe 12 for delivery by the pump 15, pipe 18, and spray nozzles 19 into the liquor heater 14. The sprayed liquor comes in contact with products of combustion from the recovery furnace. Provision is made for recirculation of the liquor within the liquor heater, if desired.

From the liquor heater, the heated waste liquor is then delivered by means of the pump 44 through the pipe 48 to the spray nozzles 50 of the thickener 42. In the thickener 42 the waste liquor is brought into contact with heated air for removal of water therefrom by evaporation. The concentrated liquor is delivered from the thickener 42 through the pipe 46 and the pump 58 into the recovery furnace 25 for combustion therein of the combustible constituents and separation of the recoverable chemicals. The combustion provides heat for generation of steam in the steam generator 32. The products of combustion pass through the air heater 23, the induced draft fan 27, and are delivered to the liquor heater 14 into contact with the liquor sprayed through the nozzle 19. Any chemicals carried over from the recovery furnace 25 in the products of combustion are collected in the waste liquor in the liquor heater 14. The combustion gases are then exhausted through the stack.

The steam from the steam generator 32 is expanded in the turbine 35 and the exhaust steam from the turbine 35 is delivered to the condensers 40 of the thickener 42. The exhaust steam is condensed in the condensers 40 and the heat thus made available is utilized for heating the air supplied to the thickener 42 by the fans 55. The heated air in the thickener, in contact with the liquor sprayed by the nozzles 50, carries off moisture by evaporation to reduce the water content of the waste liquor.

The fan 24 supplies air to the preheater 23 and therefrom to the recovery furnace. The fan 71 is provided for supplying air to the liquor heater 14. The air is heated in the liquor heater 14 by heat derived from the products of combustion in the liquor heater 14 and is delivered through the pipe 72 and may be delivered to the fan 24 or into the thickener 42, as desired. A by-pass is also provided for delivering any excess air heated in the air heater 23 and not required in the recovery furnace 25 to the thickener 42.

Figure 2:
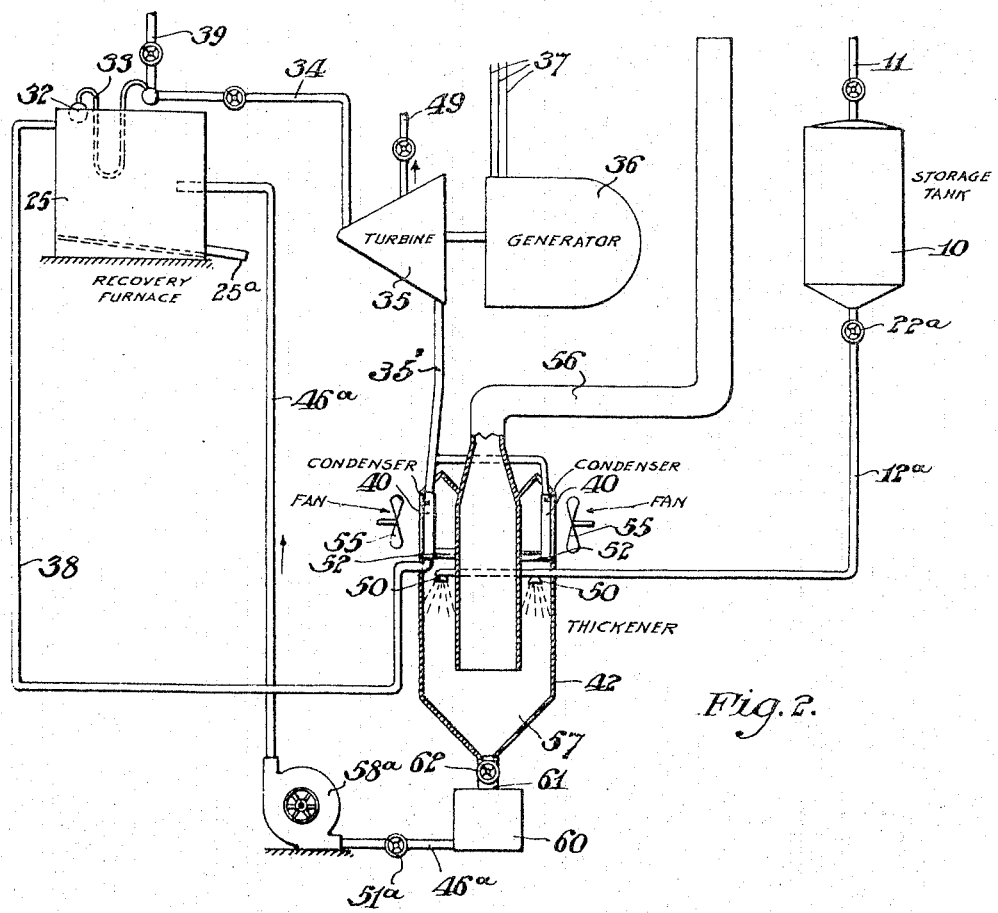
Fig. 2 is a diagrammatic view of another form of recovery system in accordance with the present invention and which is particularly adapted for the treatment of the waste liquor from paper pulp manufacture.

In Fig. 2 of the drawings there is illustrated another form of the present invention which is particularly adapted for the treatment of the waste liquor from the pulp manufacturing processes, including the alkaline processes and the sulphite process.

A storage tank 10 may be provided for receiving the waste liquor from the digesters or cooking vessels (not shown), but as hereinbefore indicated the waste liquor may be supplied directly. The storage tank 10 is connected by a pipe 12ª having a control valve 22ª therein to the thickener 42 for the spraying of the waste liquor downwardly therein by the nozzles 50 at the upper part thereof and the extraction of the moisture from the waste liquor. The lower part of the thickener 42 comprises a collecting space 57 for the residual material and may be connected to a suitable collecting tank 60 by a pipe 61 which is provided with a control valve 62. The collecting tank 60 is connected by a suitable pipe 46ª, having a control valve 51ª therein, and a suitable pump 58ª, to the recovery furnace 25 for supplying the concentrated waste liquor to the recovery furnace 25 as hereinafter more fully referred to.

The recovery furnace 25 which is employed has a steam generating section 32 and a superheater 33 for supplying superheated steam through the steam main 34 to the prime mover 35 and also, if desired, through the steam main 39 for other uses in the plant. The prime mover 35 is operated as a condensing unit and preferably consists of a condensing steam turbine. The prime mover 35 may have a tap 49 for extracting steam, if desired. The condensers 40 for the exhaust steam preferably consist of a plurality of banks of condenser elements disposed around the upper part of the thickener 42. The condenser elements are adapted to be swept with streams of air supplied by the fans 55 and air, after absorbing heat from the condenser elements, is then directed by vanes 52 downwardly, and preferably also helically, into contact with the waste liquor delivered by the spray nozzles 50. The heated air upon intermingling with the sprayed waste liquor absorbs and carries off the moisture therefrom. A discharge pipe 56 is provided for the discharge of the moisture laden air from the thickener 42.

The thickener 42 for the treatment of waste liquor from the sulphite pulp process preferably has the surfaces which come in contact with, or are adjacent the waste liquor, made of or covered with wood, ceramic material or other suitable material which is resistant to the corrosive action of this type of waste liquor.

The connections between the thickener 42 and the recovery furnace 25, including the pump 58, are preferably also of acid resistant material for the purpose of avoiding corrosion thereof.

In the form of the invention illustrated in Fig. 2, the waste liquor from the storage tank 10 is delivered directly to the thickener 42 and is sprayed thereinto by nozzles 50. The concentrated waste liquor is delivered from the thickener by the pipe 46ª and the pump 58ª into the recovery furnace 25 for combustion of its combustible constituents.

Steam from the steam generator 32 is delivered to the turbine 35, and after expansion the exhaust steam is delivered to the condensers 40 of the thickener 42. The exhaust steam is condensed in the condensers 40 and the heat from the exhaust steam is used for heating the air for the thickener 42. The condensate is returned to the steam generator 32 for reuse. The fans 55 direct air through the condensers 40 and air heated by contact with the condensers 40 then passes into contact with the waste liquor sprayed in by the nozzles 50. This heated air removes moisture from the waste liquor by evaporation and thus effects the desired concentration of the waste liquor.

Figure 3:
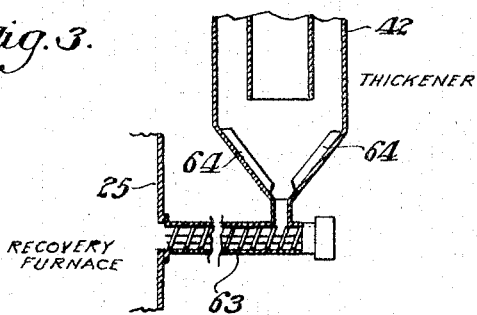
Fig. 3 is a diagrammatic view of a detail of a modified form of the present invention.

In Fig. 3, a modified form of apparatus is shown for use where the waste liquor has substantially all the moisture removed therefrom so that the residues are reduced to a dry or powdered form.

The thickener 42 is preferably provided at the lower end thereof with a screw conveyor 63 which may be used alone or with other conveying apparatus (not shown) for delivering the dry residue to the recovery furnace 25 for combustion of the combustible constituents. If desired, also, suitable scrapers 64 may be provided in the lower part of the thickener 42 for assisting in the removal of the dried residues.

The mode of operation in accordance with the present invention will be obvious from the foregoing, but it may be stated that the invention particularly contemplates the removal of moisture which is present in large quantities in the weak waste liquor. This is done by heating and thickening with the liquor heater 14 and the thickener 42, in the form of the invention illustrated in Fig. 1, and which includes the use of the recovery furnace for supplying exhaust combustion gases for use in the liquor heater 14. As shown in the forms of the invention illustrated in Figs. 1 and 2 the thickener 42 utilizes large quantities of air which are preferably heated from an available source of heat at low level, the heat from which has heretofore been wasted. At the same time, by the arrangement in accordance with the present invention, provision is made for supplying steam and electrical energy for use in the plant and for recovery of recoverable chemicals, if desired.

I claim:

1. The process of treating waste liquor from industrial processes and containing combustible constituents and water which includes spraying the waste liquor into a moving stream of heated air for carrying off in the heated air by evaporation a substantial portion of the water content of the waste liquor, burning the combustible constituents of the residual material in a furnace, extracting a portion of the heat released by the combustion for the generation of power, and transferring a portion of the extracted heat for the heating of the stream of air.

2. The process of treating waste liquor from industrial processes and containing combustible constituents and water which includes spraying the waste liquor into a moving stream of heated air for carrying off in the heated air by evaporation a substantial portion of the water content of the waste liquor, burning the combustible constituents of the residual material in a furnace, extracting a portion of the heat released by the combustion for the generation of power, and transferring a portion of the extracted heat available after the power generation for the heating of the stream of air.

3. The process of treating waste liquor from industrial processes and containing combustible constituents and water which includes spraying the waste liquor and intermingling the spray with a moving stream of heated air to remove the moisture therefrom to an extent that the combustible constituents may be burned, transferring the material of reduced moisture content to a furnace for combustion of the combustible constituents, utilizing a portion of the heat released by the combustion for generating steam, reducing the temperature and pressure of the steam while extracting power therefrom, and heating the air stream with the heat remaining in the exhaust steam after the power extraction.

4. The process of treating waste liquor from industrial processes and containing combustible constituents and water which includes spraying the waste liquor and intermingling the spray with a moving stream of furnace combustion products and subsequently spraying the liquor and intermingling the spray with a moving stream of heated air to remove the moisture therefrom to an extent that the combustible constituents may be burned, transferring the material of reduced moisture content to a furnace for combustion of the combustible constituents, extracting a portion of the heat released by the combustion for generating power, and heating the air stream with a portion of the extracted heat available after the power generation.

5. The process of treating waste liquor from paper pulp manufacture and containing combustible constituents and water, which includes spraying the paper pulp waste liquor and intermingling the spray with a moving stream of heated air to remove moisture therefrom by evaporation with the heated air, transferring the residual material from the waste liquor to a furnace for combustion of the combustible constituents, extracting a portion of the heat released by combustion in the furnace for power generation, and heating the air stream with a portion of the extracted heat available after the power generation.

6. Apparatus for treating waste liquor from industrial processes which includes a thickener, means for supplying waste liquor to said thickener, means for supplying heated air to said thickener for removing moisture therefrom by evaporation, a furnace, a steam generator for said furnace, steam expansion means for receiving steam from said steam generator, means for supplying the residual material from said thickener to said furnace for combustion of the combustible constituents thereof in said furnace, and means including exhaust steam receiving devices connected to said expansion means for heating the air supplied to said thickener.

7. Apparatus for treating waste liquor from industrial processes which includes a thickener, means for supplying waste liquor to said thickener, means for supplying heated air to said thickener for removing the moisture from said waste liquor by evaporation, a furnace, means for supplying the residuals of the waste liquor from said thickener to said furnace for combustion of the combustible constituents of the waste liquor residuals in said furnace, a steam generator heated by said furnace, a prime mover connected to said steam generator, and means for heating by the exhaust from said prime mover the air supplied to said thickener.

8. Apparatus for treating waste liquor from industrial processes which includes a thickener, means for supplying waste liquor to said thickener, means for supplying heated air to said thickener for removing the moisture from said waste liquor by evaporation, a furnace, means for supplying the residuals of the waste liquor from said thickener to said furnace for combustion of the combustible constituents of the waste liquor residuals in said furnace, a steam generator heated by said furnace, a prime mover connected to said steam generator, and a surface condenser connected to said prime mover for heating the air supplied to said thickener with residual heat in the stream from said prime mover.

9. Apparatus for treating waste liquor from industrial processes which includes a thickener, means for supplying waste liquor to said thickener, means for supplying heated air to said thickener for removing the moisture from said waste liquor by evaporation, a furnace, means for supplying the residuals of the waste liquor from said thickener to said furnace for combustion of the combustible constituents of the waste liquor residuals in said furnace, a steam generator heated by said furnace, a turbine connected to said steam generator, and means for heating by the exhaust steam from said turbine the air supplied to said thickener.

10. Apparatus for treating waste liquor from industrial processes which includes a furnace, a heater for receiving the products of combustion from said furnace, means for spraying waste liquor containing combustibles and water into said heater for contact with said combustion gases, means for circulating air through said heater out of direct contact with said products of combustion and said waste liquor, a thickener, means for spraying waste liquor from said heater into said thickener, means for supplying heated air to said thickener for removing moisture by evaporation from said waste liquor, means for delivering air from said heater to said furnace and to said thickener, and means for delivering residual material from said thickener to said furnace for combustion of the combustible constituents.

11. Apparatus for treating waste liquor from industrial processes which includes a furnace, a heater for receiving the products of combustion from said furnace, means for spraying waste liquor into said heater for contact with said combustion gases, means for circulating air through said heater out of direct contact with said waste liquor and said combustion gases, a thickener, means for spraying the waste liquor from said heater into said thickener, means including said circulating means for supplying heated air to said thickener for removing moisture from said waste liquor, and means for delivering the residual material in said thickener to said furnace for combustion of the combustible constituents.

JOHN PHILLIPS BADENHAUSEN.